(No Model.) 2 Sheets—Sheet 2.
T. J. BRAY.
PROCESS OF AND APPARATUS FOR MAKING COUPLINGS FOR WROUGHT IRON PIPES.
No. 442,604. Patented Dec. 16, 1890.
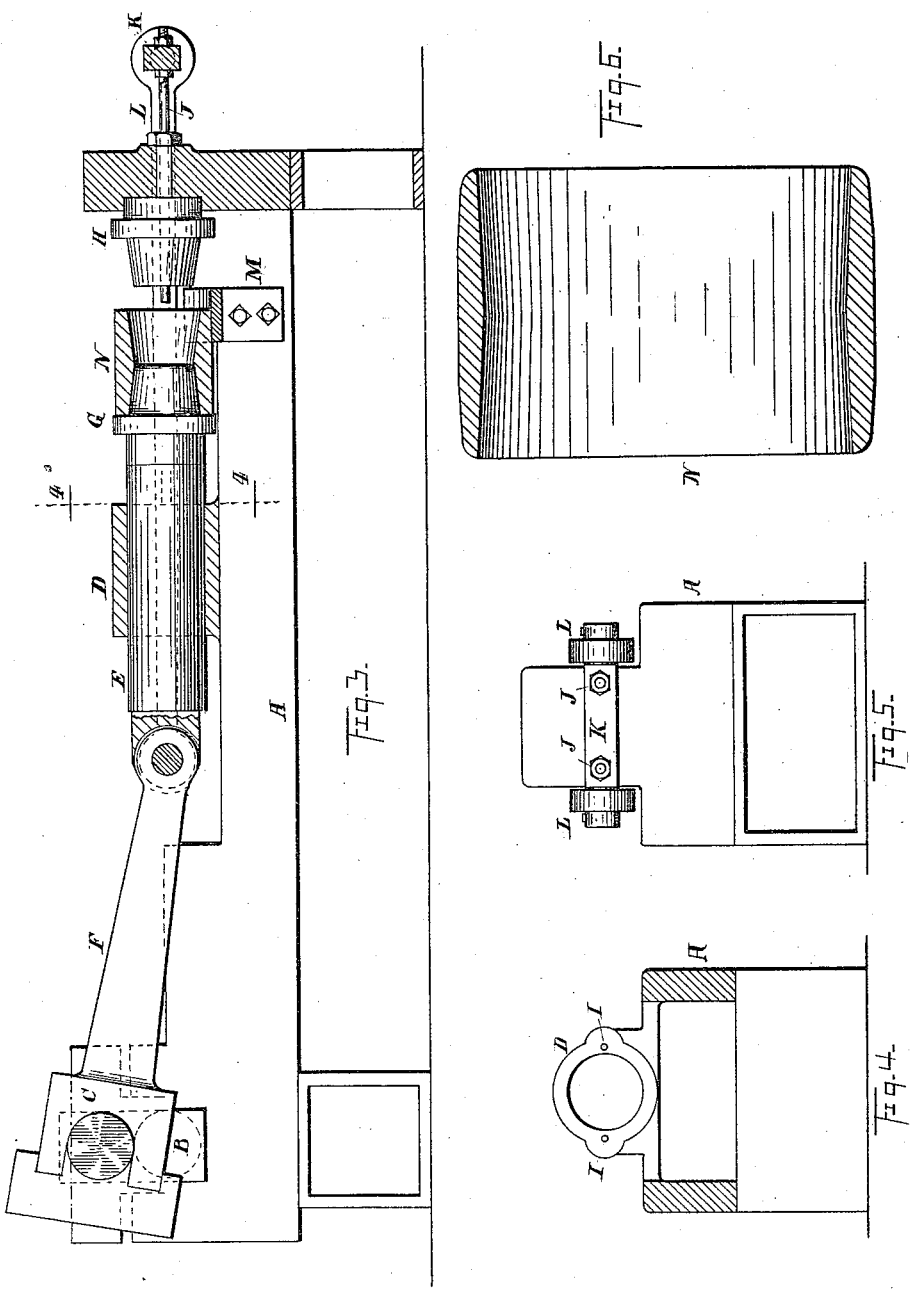
Witnesses.
Inventor
Thomas J. Bray,
by
Attorney.

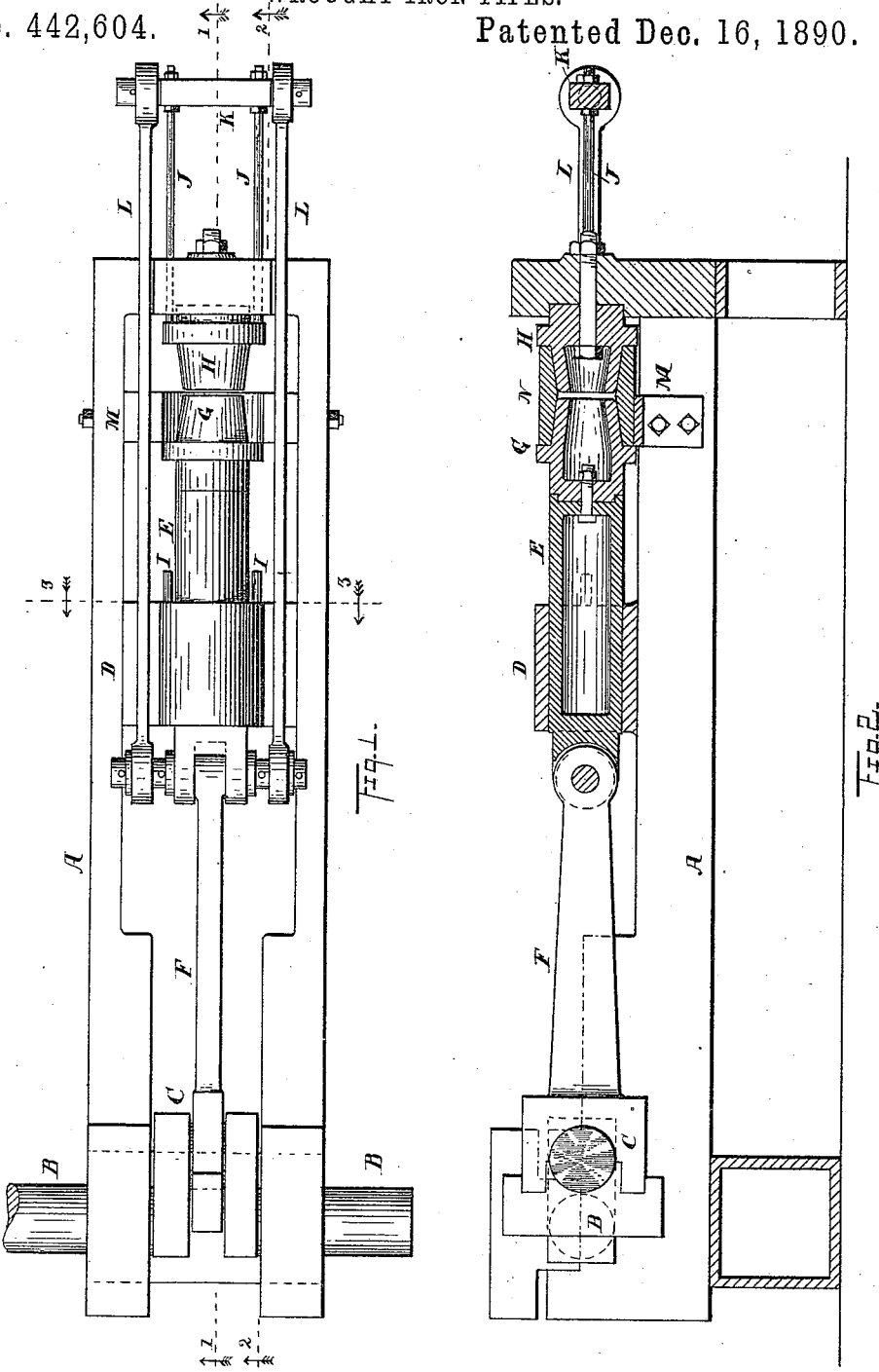

United States Patent Office.

THOMAS J. BRAY, OF WARREN, OHIO, ASSIGNOR OF ONE-HALF TO THE PAIGE TUBE COMPANY, OF SAME PLACE.

PROCESS OF AND APPARATUS FOR MAKING COUPLINGS FOR WROUGHT-IRON PIPE.

SPECIFICATION forming part of Letters Patent No. 442,604, dated December 16, 1890.

Application filed September 26, 1890. Serial No. 366,219. (No model.)

*To all whom it may concern:*

Be it known that I, THOMAS J. BRAY, a citizen of the United States, residing at Warren, in the county of Trumbull and State of Ohio, have invented a certain new and useful Improvement in Process of and Apparatus for Making Couplings for Wrought-Iron Pipe, of which the following is a specification.

The ordinary coupling for wrought-iron pipe is a short tube internally screw-threaded and of the same internal diameter throughout.

For special uses where the greatest security against leakage is required, as in machines using a volatile liquid, as ammonia, or for conveying a gas under high pressure, as natural gas, these couplings are made tapering on the inside from each end toward the center, and internally screw-threaded to fit the tapering screw-threaded ends of the pipe-sections.

Different processes and mechanism have been made to produce these couplings, as to ream each end of the coupling to the required size and then screw-thread them with taper taps; to screw-thread them straight and cut them away in each direction with taper taps; to screw-thread them to the desired size by successive use of taper taps, and to screw-thread them straight and enlarge them at each end by means of expansible screw-threaded mandrels. These processes are severally objectionable, the first, second, and third because the metal is cut away and wasted and the strength of the coupling reduced; the fourth because the ends of the coupling are strained and liable to fracture, which often occurs in using that process, resulting in loss, and all because of the expensive mechanism required and the time and labor consumed in their employment.

The objects of my invention are to produce as a new article of manufacture a pipe-coupling blank having a true cylindrical exterior and an interior tapering toward the center from each end, and to provide mechanical devices by which these blanks may be rapidly and easily constructed.

To the aforesaid purposes my invention consists in the peculiar and novel process hereinafter described, and in the mechanism shown and described for operating said process, reference being had to the accompanying drawings, which form a part of this specification.

In the accompanying drawings, in which similar letters of reference indicate like parts, Figure 1 is a plane of the machine hereinbefore referred to; Fig. 2, a vertical longitudinal section at the line 1 1 of Fig. 1; Fig. 3, a similar section at the line 2 2 of Fig. 1; Fig. 4, a transverse vertical section at the line 3 3 of Fig. 2; Fig. 5, an end elevation looking from the right of Fig. 1; and Fig. 6, a central longitudinal section, enlarged, of the completed blank.

Referring to these drawings, A is a frame or housing in which is mounted near one end a shaft B, having a central crank C.

Near the center of the housing A is a guide D, in which slides a plunger E, connected with and arranged to be reciprocated by the crank C by a connecting-rod F. On the end of this plunger is a die G, and attached to the inner end of the frame A and in alignment with the die G is a corresponding die H. These dies are similar in form, and each consists of the frustum of a cone of the desired size for one-half of the interior of the coupling-blank, and have at their bases radial flanges, and they are so arranged that at each stroke of the plunger E their smaller ends will nearly meet, and the space between their radial flanges equal the desired length of the coupling.

Projecting from the guide D are pins I, which pass through openings in and extend beyond the radial flange of the die G in its retrograde movement. Corresponding pins J rest and slide in openings in the ends of the housing A, and are arranged to pass through similar openings in the flange of the die H. These pins are connected with a cross-head K, which is moved in unison with the plunger E by connecting-rods L. Vertically in front of and below the die H and supported by the housing is a rest M to sustain the couplings before being engaged by and after being released from the dies.

In my process the coupling is welded in the usual manner, but is made thinner at each end than at the center, and is convex in longitudinal central section.

The machine hereinbefore described being put in motion, each coupling (marked N in the drawings) immediately on leaving the forging-hammer and while still at a red heat is placed in the rest M, with its opening in alignment with the dies, and being entered by the die G is carried forward by it onto the die H, and as these dies approach, as hereinbefore stated, is internally swaged by them to the desired shape, the ends being expanded to the same external diameter as the center, as shown in Fig. 6, making a straight tube on the outside, while the radial flanges render the ends true and the length of the couplings uniform.

On the return-stroke of the plunger E the pins J strip the coupling from the die H, and at the end of the stroke the pins I strip it from the die G. The coupling thus produced is then screw-threaded from each end with taper taps.

I claim as my invention—

1. The herein-described process for making internally centrally tapering pipe-coupling blanks, which consists in forging the blank with an even internal diameter and a longitudinally-convex exterior, and internally expanding the ends until the external contour is substantially straight, substantially as shown and described.

2. An improved process for making internally centrally tapering pipe-coupling blanks, which consists in forging the coupling with an even internal diameter, and while heated expanding the interior from each direction with tapering mandrels, substantially as shown and described.

3. In a machine for swaging pipe-coupling blanks, the combination of frusto-conical dies having their axes in alignment, and mechanism for moving one toward the other, substantially as shown and described.

4. In a machine for swaging pipe-coupling blanks, the combination of frusto-conical dies having radial flanges and arranged in axial alignment, and mechanism for moving one toward the other, substantially as shown and described.

5. In a machine for swaging pipe-coupling blanks, the combination, with the frusto-conical dies G H, of the stripping-rods I J, arranged to operate substantially as shown.

6. The herein-described machine for swaging pipe-coupling blanks, consisting of the frame A, shaft B, bearing the crank C, guide D, plunger E, connecting-rod F, dies G H, cross-head K, stripping-rods I J, and connecting-rods L, all constructed and arranged substantially as shown and described.

In testimony that I claim the above I hereunto set my hand.

THOMAS J. BRAY.

In presence of—
GEORGE D. KIRKHAM,
E. B. MCCRUM, Jr.